Oct. 29, 1929.  A. GOTELLI  1,734,010
FRUIT PITTING MACHINE
Filed Aug. 18, 1926   4 Sheets-Sheet 1
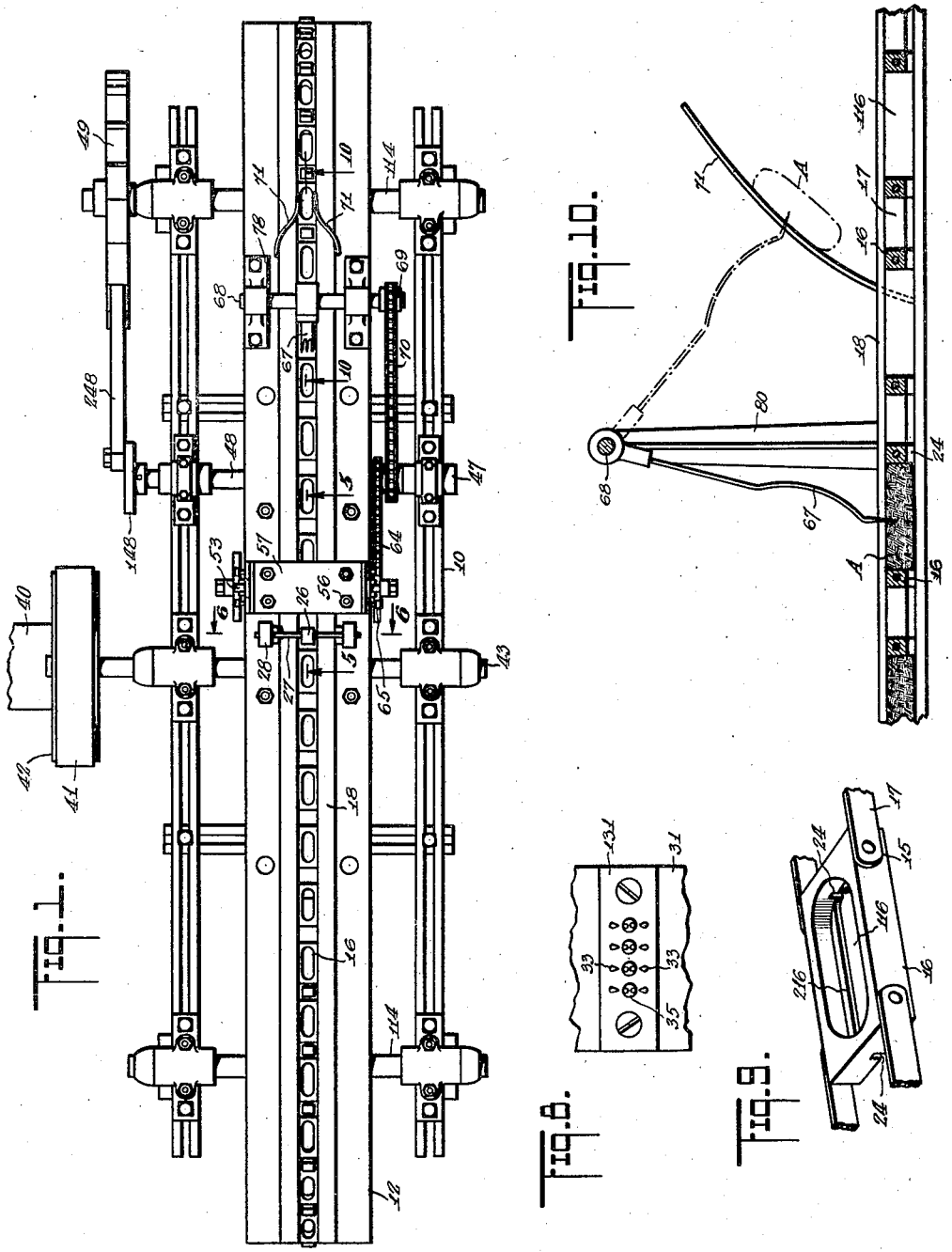
WITNESSES:
INVENTOR
Anthony Gotelli,
BY
ATTORNEYS

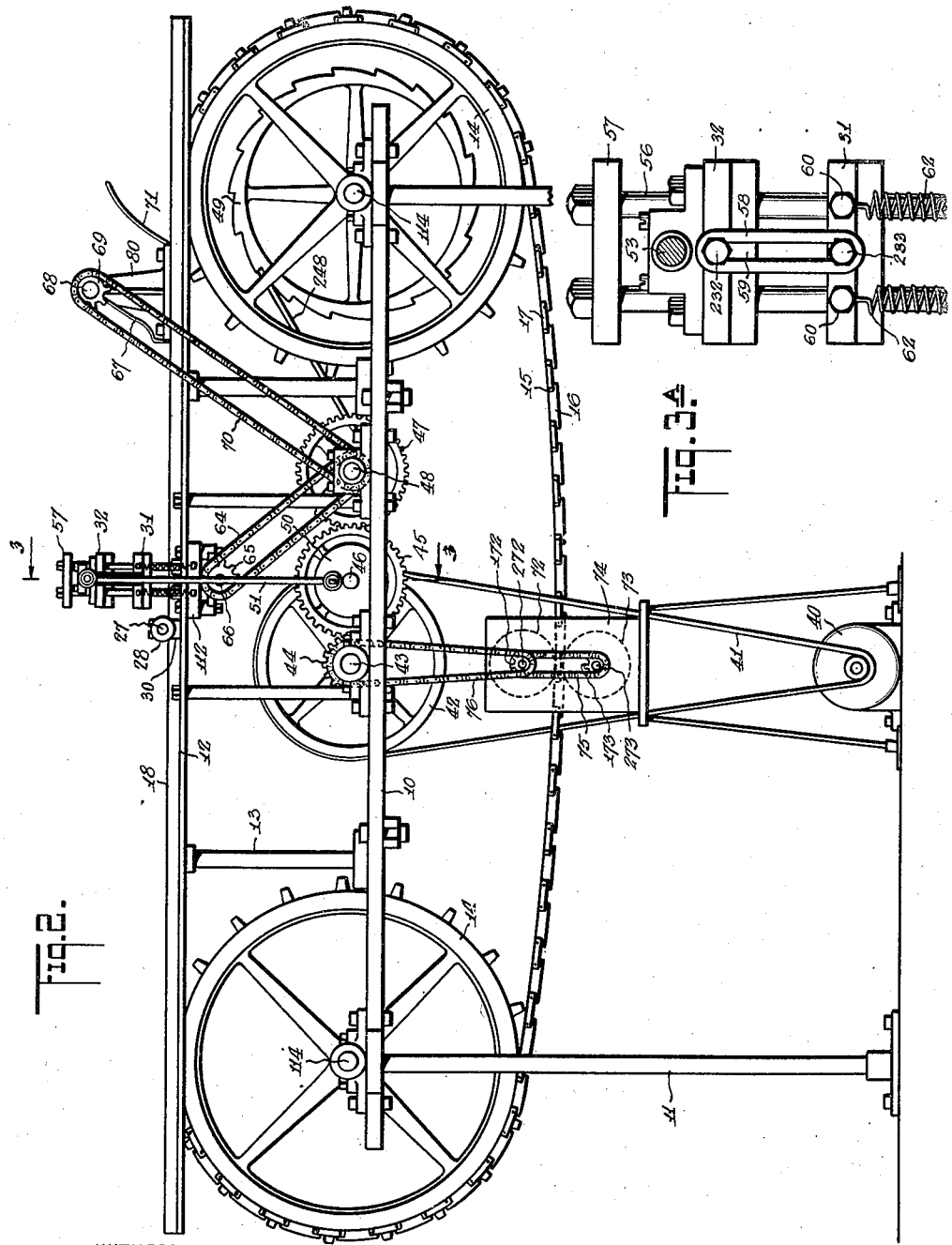

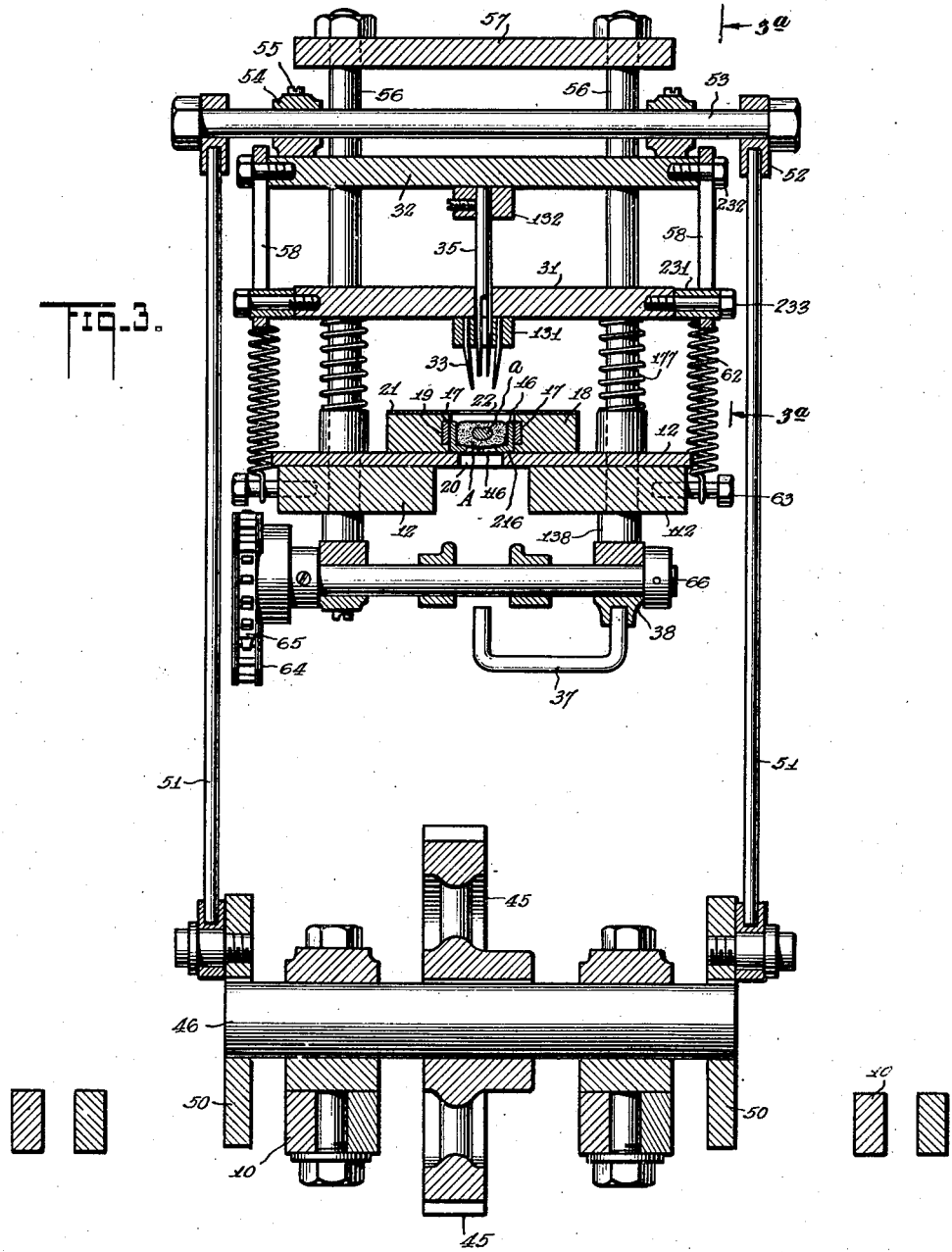

Oct. 29, 1929.  A. GOTELLI  1,734,010
FRUIT PITTING MACHINE
Filed Aug. 18, 1926  4 Sheets-Sheet 4
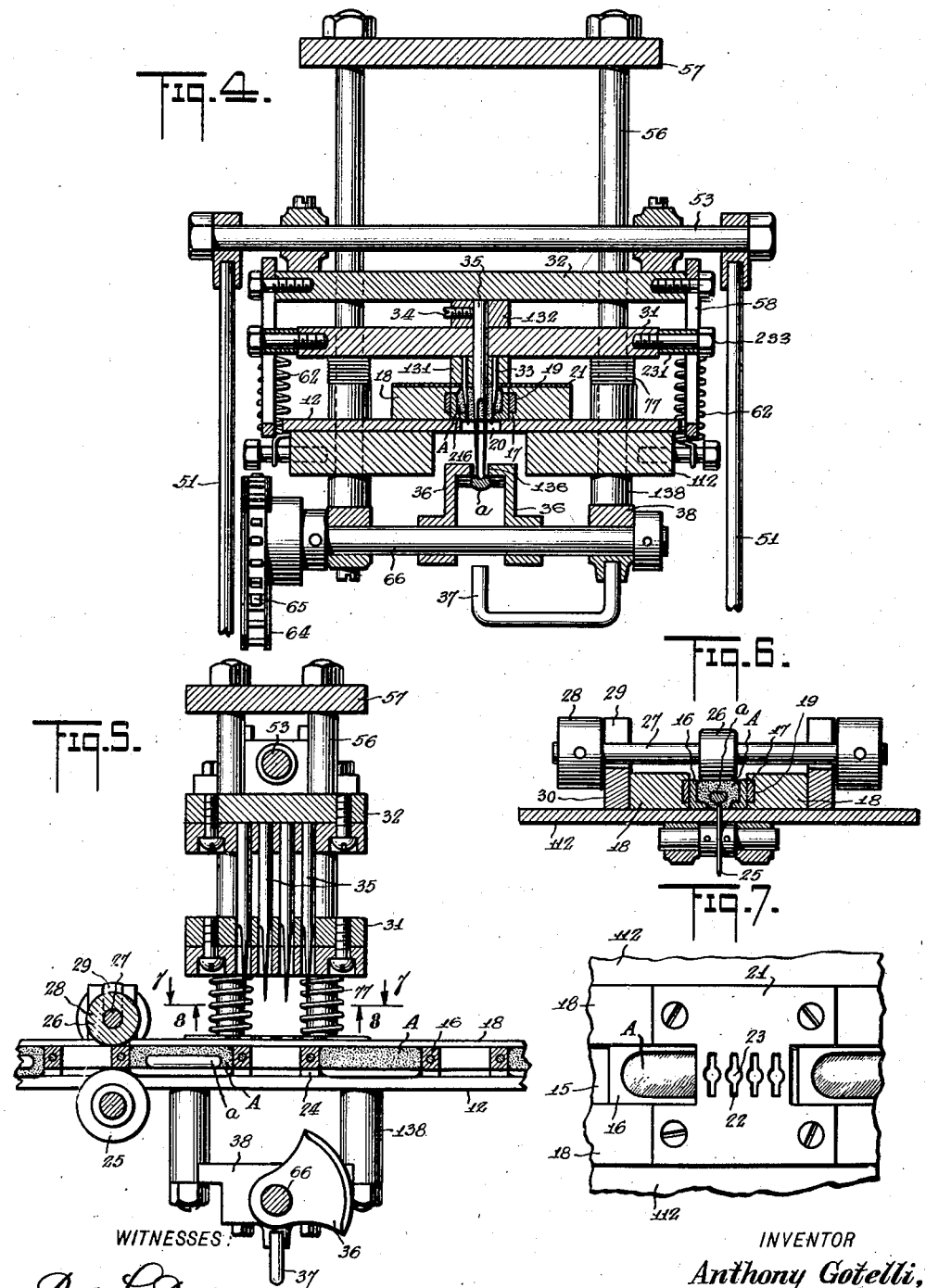
INVENTOR
Anthony Gotelli,
BY
ATTORNEYS Patented Oct. 29, 1929

1,734,010

UNITED STATES PATENT OFFICE

ANTHONY GOTELLI, OF NEW YORK, N. Y.

FRUIT-PITTING MACHINE

Application filed August 18, 1926. Serial No. 130,045.

My invention relates to fruit pitting and has in view more particularly the pitting of dates, although not limited in all its phases to such use.

The general object of my invention is to provide a pitting machine improved in various particulars, having in view the removal of the pit without unduly mutilating the fruit, as well as to insure precision and reliability, looking to insure the positive removal of the pit from each date passed through the machine.

The nature of my invention and its distinguishing features and advantages will clearly appear as the description proceeds.

Reference is to be had to the accompanying drawings, forming part of this specification, it being understood that the drawings are merely illustrative of one example of the invention.

Figure 1 is a plan view of a date-pitting machine embodying my invention;

Figure 2 is a side elevation thereof;

Figure 3 is a transverse vertical section on the line 3—3 of Figure 2; showing the centering means and the pit removing means in a raised position above the carrier chains and before the operation of pitting a date;

Figure 3ª is a section on the line 3ª—3ª of Figure 3.

Figure 4 is a view similar to Figure 3 but omitting the parts shown at the lower portion of Figure 3, the said Figure 4 showing the parts after the operation of removing the pit from the date;

Figure 5 is a detail in longitudinal vertical section, on the line 5—5 of Figure 1;

Figure 6 is a transverse vertical section on the line 6—6 of Figure 1;

Figure 7 is a fragmentary view showing in plan the plate for preventing the dates from rising with the pit removing means;

Figure 8 is an inverted view of the centering and pitting means as indicated by the arrows numbered 8 is Figure 5;

Figure 9 is a fragmentary view in perspective showing a portion of the date carrying chain;

Figure 10 is an enlarged longitudinal vertical section in a plane indicated by the line 10—10 in Figure 1.

In carrying out my invention in accordance with the illustrated example, a suitable frame 10 is provided here shown as supported on legs 11. The said frame supports by posts 13 the table 12, over which passes the working run of an endless chain 15, said chain running about the sprocket pulleys 14. Said chain 15 carries the fruit through the machine and for that purpose includes fruit receiving cups 16 connected by links 17, said cups having openings 116 in the bottom through which the pit is forced. On table 12 are tracks 18 having longitudinal recesses 19 to afford clearance for links 17. The table 12 includes a top 112 having a hole 20 through which the pits pass. On top of track 18 is a plate 21 having slots 22, with openings 23 at the center through which the pitting devices operate, as will appear. The letter "A" indicates a date and "a", the date pit. The date is adapted to rest in cups 16 on ledges or shoulders 216 at the sides. Each cup also has at the ends thereof, at the bottom, slots 24 for clearance for a revolving knife 25 for slitting the fruit at the under side. Said knife is shown here as a revolving knife supported on the under side of table top 112.

I provide means to resist the upward pressure exerted by the knife in slitting the fruit and thereby prevent the action of the knife from lifting the fruit out of the cup 16 when a cup arrives at said knife. For the stated purpose, use is made, in the illustrated example, of a roller 26. Said roller has a transverse shaft 27 having weights 28, said shaft being free to play in vertical slots 29 in posts 31.

A lower crossbar 31 is provided and an upper crossbar 32. Crossbar 31 has a block 131 to which is secured pit centering pins 33 in two rows adapted to take positions at opposite sides of the center of the date. For example, on the under side of crossbar 32 is a block 132 to which is secured by set screws 34 pitting spindles 35 having forked lower ends, said spindles being positioned between the two rows of pins 33.

Beneath the table 12 at either side of the vertical plane of spindles 35 are elements 36 spaced to present a slot 136 therebetween to detach the pits "a" as hereinafter described. The elements 36, which are mounted to revolve as will appear, coact with the upturned terminal on an arm 37 held fixed to block 38 on hangers 138, depending from table member 112.

The belt 41 is driven by a suitable motor 40 and runs over a pulley 42 on the shaft 43 on which is a pinion 44 meshing with gear wheel 45 on a shaft 46, said gear wheel 45 in turn meshing with a gear 47 on a shaft 48. On the shaft 48 is a crank disc 148 (see Figure 1) to which is centrally pivoted a pawl 248 meshing with a ratchet wheel 49 on the shaft 114 of one of the sprocket pulleys 14 so that said sprocket pulley and chain 15 will be fed by a step-by-step movement due to pawl 248 and ratchet 49. On the shaft 46 are crank discs 50 to which are eccentrically pivoted connecting rods 51 extending upwardly to members 52 on a cross-rod 53 passing through blocks 54 on crossbar 32, said bar 53 being fastened by set screws 55 or the like. The operation of connecting rods 51 serves to give up and down movements to cross head 32 on vertical guide posts 56 connected by top member 57. Depending from the ends of crossbar 32 are guides 58 having slots 59 (see Figure 3ª), the upper ends of the guides 58 being secured to crossbars 32 by screws 232. Springs 62 are secured at their upper ends to the respective outer ends of crossbar 31 by screw bolts 60 or by equivalent means. The lower ends of the springs are made fast to the table element 112, as by bolts 63. Passing through the slots 59 are screw bolts 233 screwing into the ends of crossbar 31, said bolts having roller sleeves 231 thereon, lying in slots 59.

An endless chain 64 driven from the shaft 48 passes about a sprocket pinion 65 on a shaft 66, carrying the elements 36 (see Figures 1 to 4) for turning said elements 36 so that the same pass at each side of the upturned end of arm 37.

To remove the dates from the working run of the chain 15 after the pits have been removed, I provide an impaling fork 67 (see Figures 1, 2 and 10). Said impaling fork 67 is mounted on a shaft 68 turning in bearings 78 on posts 80 rising from table 12. The impaling fork 67 picks up the date or other fruit and the latter is stripped from said fork by diverging stripper fingers 71 between which said fork moves in turning about the axis of the shaft 68.

While the device described is practical without washing or brushing of the chain to clean same of adhering fruits parts, it is desirable in some cases to do so. In the illustrated example upper and lower revolving cylindrical brushes 72 and 73 are employed, between which the chain 74 runs, the lower roller 73 being immersed in water in a tank 74. Said rollers 72 and 73 are both positively driven by a chain 75 over running sprockets 172 and 173 on the shafts 272 and 273 of said brushes.

In using the machine, dates, for example, are placed in the cups 16 in advance of the pitting means. As the chain carries the date beneath presser roller 26 it is forced firmly into the cup and then passes beneath the plate 21. The operation of the pit centering and pit removing means is such that as the date comes under said plate 21 the turning of shaft 46 draws the connecting rods 65 downwardly and thereby moves crossbar 32 downwardly. The downward movement of the bar 32 carries downward also the guides 58 (see Figures 3ª and 4). As guides 58 move downwardly the springs 62 draw crossbar 31 downwardly until the pins 33 passing at each side of the pit "a" in the date "A," strike the ledges 216 and center the pit at the opening 116 of cup 16 and in line with hole 20 in table 12. The continued downward movement of connecting rods 51 finally causes the pitting spindles 35 to move downwardly and thereby causes the pit to be forced out of the date and through the opening 116 and hole 20 into the plane of the slot 136 of pit stripping elements 36. The pit is prevented from rising with the ejector spindles 35 by said elements 36 and caused to move away from the plane of the pitting spindles by the arm 37. Upon the upward movement of the connecting rods 51 the reverse operation takes place, since thereby the crossbars 31 and 32 will be raised.

Referring again to the forked pins 33, the members thereof take a position at each side of the pit and are then in a position to resist any lateral displacement of the pit to a position out of register with the opening 116 of cup 16 and out of line with the hole 20 in table 12. At the same time, said pins 33 perform the function of preventing fruit from being displaced when the pitting spindles 35 are functioning.

Cushioning springs 77 may be provided beneath crossbar 31. As the pitted date passes beyond the plate 21 and arrives beneath the impaling fork 67 the fruit will be impaled by said fork and in the revolving of the latter (see Figure 10), the date "A" will be stripped from the fork by the strippers 71.

I would state furthermore that while the illustrated example constitutes a practical embodiment of my invention, I do not limit myself strictly to the exact details herein illustrated, since, manifestly, the same can be considerably varied without departure from the spirit of the invention, as defined in the appended claims.

I claim:

1. A fruit pitting machine including conveyor means to carry the fruit through the machine, a track over which said conveyor means travels, a pit centering means mounted to reciprocate toward and from the path of travel of the conveyor means, means to force the pit from the fruit and means to position the centering means adjacent the pit and subsequently cause the pit-forcing means to be actuated.

2. A fruit pitting machine including conveyor means to carry the fruit through the machine, a track over which said conveyor means travels, a pit centering means mounted to reciprocate toward and from the path of travel of the conveyor means, means to force the pit from the fruit and means to position the centering means adjacent the pit and subsequently cause the pit-forcing means to be actuated, together with a knife disposed below the track and extending into the path of the conveyor means for slitting the fruit, said knife being in advance of the pit centering and forcing means.

3. In a fruit pitting machine, an endless chain made up of a connected series of fruit receiving cups each having an opening in the bottom for the escape of pits and having shoulders to retain the fruit as the pit is removed, pit centering means, means to reciprocate said pit centering means toward and from the path of travel of said chain on its working run, pit removing means and means to actuate the said pit removing means following the engagement of said pit centering means with the pit.

4. In a fruit pitting machine, an endless series of fruit receiving cups, pit removing means disposed along the path of travel of said series of cups, a fruit impaling device mounted to revolve and positioned for impaling the fruit after the pit has been removed, and fruit stripping means positioned to engage an impaled fruit and detach the same from the impaling device.

5. In a fruit pitting machine, upper and lower crossbars, a track beneath the lower crossbar, a conveyor to carry fruit along said track, pit centering means on the lower crossbar, pit removing means on the upper crossbar and means to cause movement of said crossbars toward and from the path of movement of the said conveyor means and to cause the lower crossbar with the centering means to move in advance of the pit removing means.

6. In a fruit pitting machine, upper and lower crossbars, a track beneath the lower crossbar, a conveyor to carry fruit along said track, pit centering means on the lower crossbar, pit removing means on the upper crossbar, means to actuate the upper crossbar, guides on said upper crossbar through which members on the lower crossbar pass and springs to draw down and cause the lower crossbar to move toward the track following the movement of the upper crossbar toward the plane of the tracks.

7. In a machine of the character described a traveling member, a plurality of individual fruit-holding receptacles carried by said traveling member, a reciprocating pitting member and reciprocating pit controlling members movable to and from a position adjacent the pit of the fruit carried by said traveling member and at opposite sides of the path of reciprocation of said pitting member, said reciprocating members being convergent at their terminals to prevent engagement thereof with the fruit-holding receptacles.

8. In a machine of the character described, a traveling member, a plurality of individual fruit-holding receptacles carried by said traveling member and formed with openings in the bottom, a knife disposed below and adjacent to the path of travel of said traveling member and adapted to form a cut in the fruit in one of said receptacles arriving at the knife and means above the path of travel of said traveling member positioned in the vertical plane of the knife and adapted to resist the upward pressure of the knife in cutting the fruit.

9. In a fruit pitting machine, a fruit conveyor, movable members for positioning the pit therebetween, a knife for longitudinally slitting the fruit and an ejector for extracting the pit through said slit.

10. In a fruit pitting machine, a fruit conveyor having pockets for the reception of the fruit, movable pins for centering the pit, a knife for longitudinally slitting the fruit and an ejector for extracting the pit through said slit.

11. In a fruit pitting machine, a fruit conveyor having pockets for securely holding the fruit, movable pins for centering the pit within the fruit, a knife for longitudinally slitting the fruit and an ejector for extracting the pit through said slit.

12. In a fruit pitting machine, a fruit conveyor having an intermittent or step-by-step motion, movable members for positioning the pit in the path of travel of an ejector, a knife for longitudinally slitting the fruit when in motion and an ejector for extracting the pit through said slit when the fruit is momentarily at rest.

13. In a fruit pitting machine, a fruit conveyor having an intermittent motion, movable members for centering the pit within the fruit, means for longitudinally slitting the fruit when in motion, and means for extracting the pit through the said slit when the fruit is momentarily at rest.

14. In a fruit pitting machine, means for holding the fruit, means for positioning the pit within the fruit in the path of travel of an ejector, a knife for longitudinally slitting the fruit and an ejector for extracting the pit through said slit.

ANTHONY GOTELLI.